April 15, 1924.

A. B. LANDIS

CHANGE SPEED GEARING

Filed Dec. 23, 1918   6 Sheets-Sheet 2

1,490,516

Inventor
Abraham B. Landis.
By Bradford & Doolittle,
Attorneys

April 15, 1924.

A. B. LANDIS 1,490,516

CHANGE SPEED GEARING

Filed Dec. 23, 1918  6 Sheets-Sheet 4

Inventor
Abraham B. Landis.
By Bradford & Doolittle
Attorneys

April 15, 1924.　　　　A. B. LANDIS　　　　1,490,516
CHANGE SPEED GEARING
Filed Dec. 23, 1918　　　6 Sheets-Sheet 5

Inventor
Abraham B. Landis
By Bradford & Doolittle
Attorneys

Patented Apr. 15, 1924.

1,490,516

UNITED STATES PATENT OFFICE.

ABRAHAM B. LANDIS, OF ENFIELD, PENNSYLVANIA; BENJAMIN F. LANDIS, HARRY L. LANDIS, AND A. FRANKLIN LANDIS EXECUTORS OF SAID ABRAHAM B. LANDIS, DECEASED.

CHANGE-SPEED GEARING.

Application filed December 23, 1918. Serial No. 267,984.

*To all whom it may concern:*

Be it known that I, ABRAHAM B. LANDIS, a citizen of the United States, residing at Enfield, Montgomery County, and State of Pennsylvania, have invented and discovered certain new and useful Improvements in Change-Speed Gearings, of which the following is a specification.

The type of change speed transmission gear in common use, comprising gears which slide into and out of mesh, has many well recognized disadvantages and faults, among which may be mentioned the rasping clash of the gears when a change is made, the unpleasant jolting of the car resulting, the strain and tear upon the tires caused by the jerky motion, and the frequent breakage of parts, all of which faults are due to the fact that the gears must be slid together, or into mesh, while in motion to obtain the different changes of speed and engage suddenly, and with one engaging member moving at a different speed from the other. The shifting of such type of gear also requires considerable exertion and is accomplished only with much inconvenience and trouble. Because of the laborious operation the driver of a car will frequently take risks of danger and accident rather than undertake the exertion and go to the trouble to accomplish the change, and serious accidents frequently result as a consequence of such hazardous risks.

The object of my invention is to provide a type of gear by which the various speeds may be secured through the operation of selective gear mechanisms, in which the shifting of the parts required to secure the desired speed is attained while the clutch is disengaged, and the shifting of said parts and control of the clutch is accomplished by the power of the motor as applied and controlled through the movement of a small hand lever, or controller, which can be operated with ease by anyone, only such effort being required as is necessary to throw the controller from one position to another, this motion of the controller bringing into action the different mechanical elements required to automatically effect the change in speed through the power of the motor. By such a type of gear the disadvantages and faults first above mentioned are overcome and a gear provided whereby the change in speed may be achieved with ease and without clashing, rasping or undue strain upon the mechanical parts, or unnecessary wear and tear upon the tires, and all automatically through the power of the motor as applied by a manually operated controller, all as will hereinafter be more fully described and claimed. While this gear is particularly designed for use in automobile construction, it will be understood that it may be used whenever appropriate in power transmission mechanism.

Referring to the accompanying drawings, which are made a part hereof, and on which similar reference characters indicate similar parts.

Figure 13 a detail view showing one of the cam slots in the parts which operate the drifting ring;

In said drawings, the portion marked A represents the automobile frame, B the engine, C the transmission gear casing, and D the supports for said casing.

The automobile frame or chassis A, the body $A^1$ and the engine B carried thereby, are all of any approved or desired construction and arrangement, and require no special description except as they may be incidentally referred to in describing the other parts.

The gearing is chiefly incorporated within the casing C, which is supported beneath the frame A upon suitable strap supports D, or in any convenient manner best adapted to the structure of the particular machine. A suitable cover c fits tightly and is secured upon the top of the casing C, thereby protecting the working parts therein from dust and dirt and also confining the oil used for lubrication.

The power is applied from the engine to a collar 20, which is connected to the engine shaft and keyed to the outer end of a sleeve 21 formed integral with, or rigidly secured to, the outer casing 22 of a multiple disk clutch which thus becomes the driving element, or "driving shaft" and forms the main connection between the power and the change speed gears. The sleeve 21 rotates in a bearing 23 which is bolted to one end of the casing C. The casing 22 is provided with a cylindrical or rim portion 24 formed on its inner side with a series of ribs 25 which fit into corresponding grooves 26 formed in the periphery of a series of disks 27 forming part of the driving members of the clutch. The other set of disks 28 are similarly notched as at 29 on their inner edges to receive a series of ribs 30 formed on the outer surface of the cylindrical driven member 31, carried by a hub 32, which is keyed to a shaft 33 having one end journaled in a bearing-sleeve or bushing 34 carried within the sleeve 21. Slidably mounted on the hub 32 is a sleeve 35 provided with a series or radial arms 36 which pass through slots 37 formed in the member 31 and which are connected at their outer ends by a ring 38 which is brought to bear against the face of the adjacent disk and thereby cause frictional engagement between the several disks 27 and 28 of the clutch. A circumferential groove 39 is formed in the sleeve 35 to receive a pair of rollers 40 which are journaled in the ends of a yoke 41 which depends from a rock-shaft 42 journaled in the sides of the casing C and provided with a bell-crank lever 43 at one end. The depending arm 44 of the lever 43 is formed with a cam surface 45 against which operates a roller 46 mounted in the end of a lever 47 journaled on a stub shaft 48 and formed integral with a pedal lever 49 which passes through the floor of the car to within convenient reach of the operator. A spring 50 normally tends to hold the lever 47 in its lowered position while another spring 51 is connected to a horizontal arm 52 of the lever 43 and tends to hold the cam surface 45 against the roller 46 and move sleeve 35 forward until rollers 57 and 58 pass into recesses 53 and 54 and permit spring 62 to set the clutch, as will presently be described. The openings 53 and 54 forming shoulders 55 and 56, are cut into the opposite sides of the sleeve 35 and are adapted to receive the rollers 57 and 58 mounted in arms 59 and 60 pivoted to a collar 61 which is slidably mounted on the shaft 33. A spring 62 is mounted on the shaft 33 and bears at one end against a collar 63 threaded on the shaft 33 and at its opposite end against the collar 61 which, when the clutch is on, causes the rollers 57 and 58 to press against the shoulders 55 and 56, thereby firmly pressing the ring 38 against the disks 28. The rollers 57 and 58 are held out against the shoulders 55 and 56, when the clutch is applied, by means of a collar 64 having flat sides 65 upon which the rollers act. When the clutch is released, the shoulders 55 and 56 move the rollers 57 and 58 back against the tension of the spring 62 until the rollers have passed the collar 64. The rollers then drop into the recess behind the collar 64, take the thrust of the spring 62 and permit the sleeve 35 to pass freely over them without further compression of the spring 62. On return movement, as soon as openings 53 and 54 register with the rollers 57 and 58 they will fly out into said openings and bring the pressure of spring 62 to bear against the clutch members.

Figures 14, 16, 17, 18:
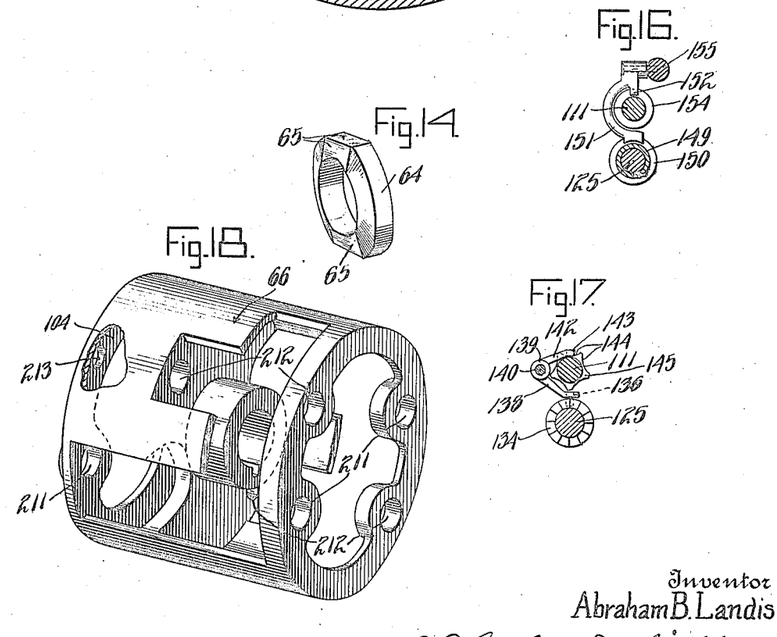
Figure 14 a detail view of the roller spreading collar.
Figure 16, a detail section on the dotted line 16—16 in Figure 8.
Figure 17, a detail section on the dotted line 17—17 in Figure 8.
Figure 18, a detail perspective of the housing for the gears.

All of the gearing used in the first speed, second speed of reverse motion, is enclosed in, or carried by, a revolving housing 66, (Figure 18), which is keyed to a sleeve 67 which passes through a bearing 68 secured in the casing C and is provided with a collar 69 to which the ordinary universal joint is connected.

Figures 2, 3:
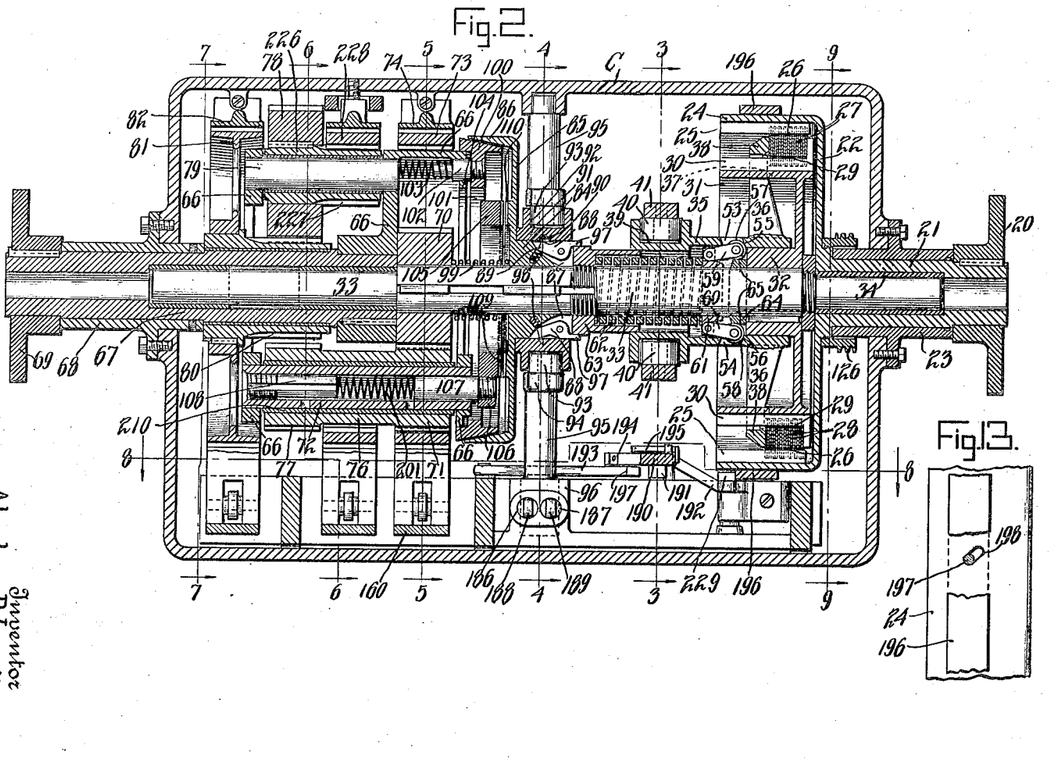
Figure 2, a horizontal section through the gear, the right-hand end, from shaft 95, being taken on dotted line 2—2, and the left-hand end on dotted line 2'—2' in Figure 6, showing the relation of parts therein.
Figure 3, a cross section on the dotted line 3—3 in Figure 2, showing the main clutch operating elements.
Figure 3:
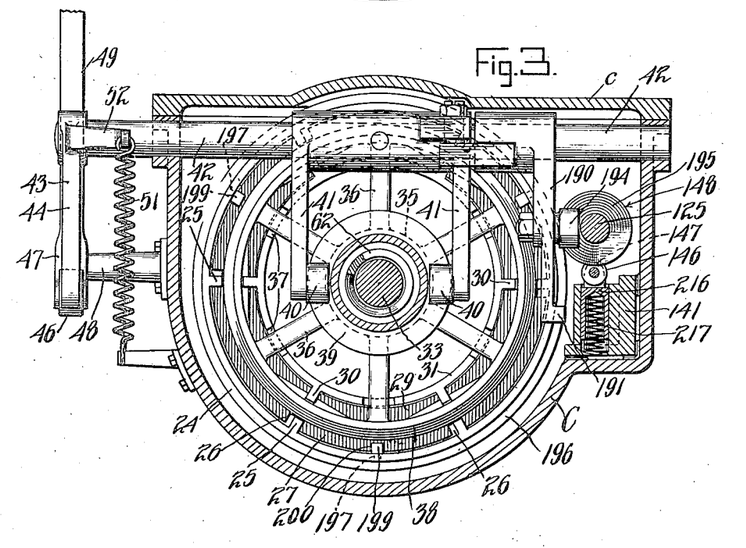
Figure 4:
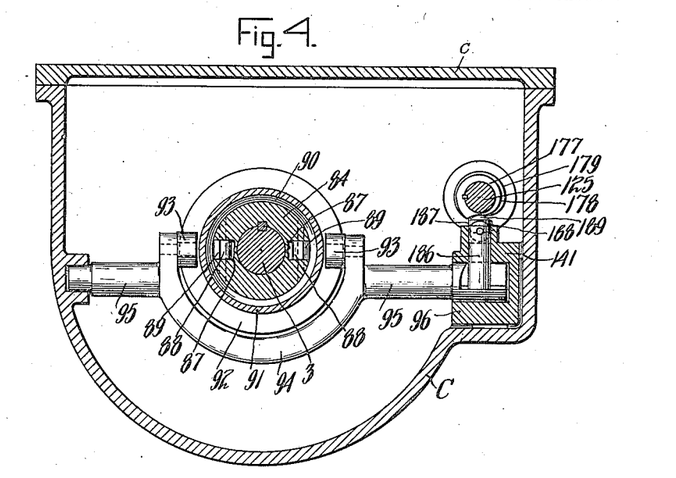
Figure 4, a cross section on the dotted line 4—4 in Figure 2 showing the auxiliary clutch operating elements, through which the direct drive is also operated.
Figure 5:
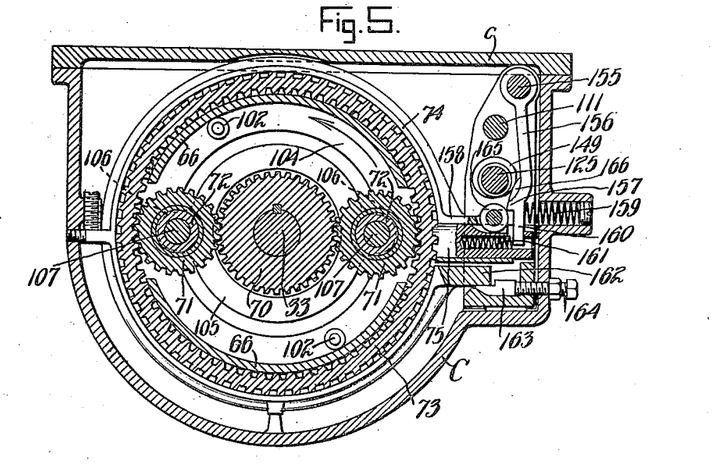
Figure 5, a cross section on the dotted line 5—5 in Figure 2, showing the brake band and elements for securing the first speed forward.

The gearing for the first speed is as follows (see Figures 2 and 5). Shaft 33 has a pinion 70 keyed thereto which is always in mesh with a pair of pinions 71 journaled to run on bushings 210 on tubular shafts 72, which shafts are mounted in openings 211 in the housing 66. These pinions 71 are likewise in continuous mesh with an internal gear ring 73 loosely mounted on the outside of the housing 66. The rotation of the ring 73 is retarded by means of a friction grip band 74, and is afterward locked from rotation by means of a spring pressed latch 75. When in its locked position, the rotation of the pinion 70 is imparted to the pinions 71 which travel around within the ring 73 carrying with them the housing 66 which transmits its motion to the sleeve 67 thereby driving the car forward on its slowest gear.

Figure 6:
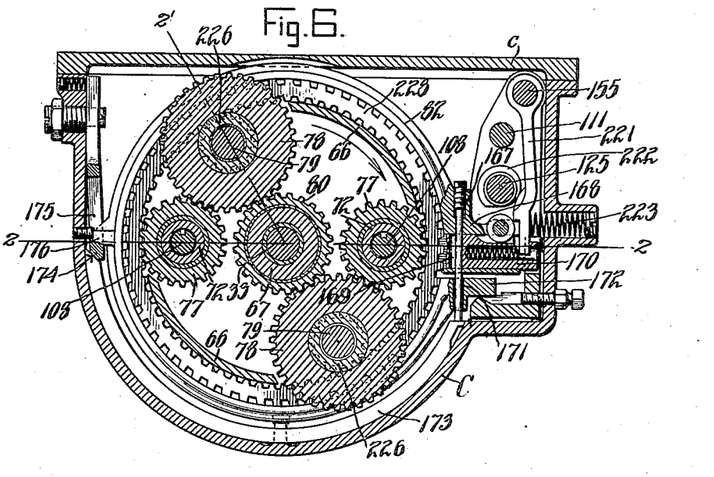
Figure 6, a cross section on the line 6—6 in Figure 2 showing the gearing and brake band of the reversing drive.
Figure 7:
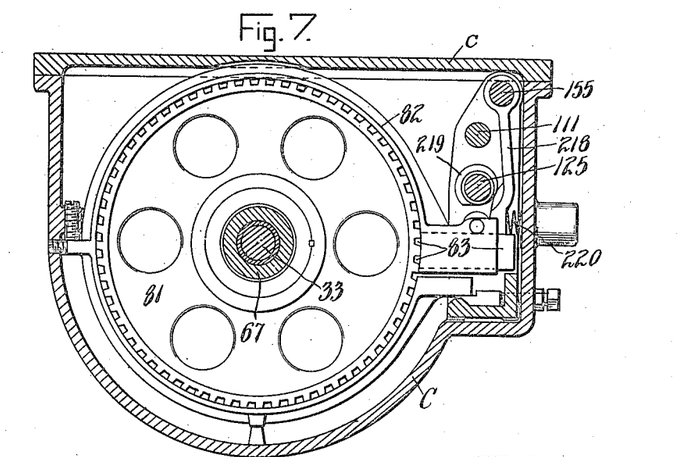
Figure 7, a cross section on the dotted line 7—7 in Figure 2 showing the brake band of the second speed forward.

The gearing for the second speed is as follows (see Figures 2, 6 and 7). The shaft 33, pinion 70 and pinions 71 all operate as for the first speed, with the ring 73 running loosely on the housing 66. The pinions 71 are formed on one end of the sleeves 76 which have similar pinions 77 formed upon the opposite ends thereof and in mesh with pinions 78 journaled to run upon shafts 79 which are secured in openings 212 in housing 66. Both pinions 78 mesh with a single pinion 80 which runs loosely on the sleeve 67 and which is keyed to the hub portion of a wheel 81 likewise held at the proper time by a grip band 82 and locked from rotation by a spring pressed latch 83, similar in construction and operation to the band 74 and latch 75 previously described. When the wheel 81 is prevented from rotation by the band 82 and latch 83, the pinion 80 is also held stationary which causes the pinions 78 to travel around the pinion 80, taking with it the housing 66 which in turn rotates the sleeve 67 thereby driving the car forward on its second speed.

The third, or high speed, is a direct drive in which the driving element and driven element are directly connected by means of a cone clutch, as follows. Keyed to the shaft 33 is a hub 84 provided with a disk 85 from which extends an annular cone-shaped flange 86 forming the driving member of the clutch referred to. Mounted in radial slots 87 cut in the hub 84 are pivoted dogs 88, one end of each of which is bevelled at 89 to be acted upon by an annular V-groove 90 cut in a collar 91 which is also formed with an annular channel 92 in which operate rollers 93 secured to the upper ends of a yoke 94 supported on trunnions 95, one of which is reduced in size and journaled in the casing C and the other enlarged and journaled in a bearing 96 to be further described. The opposite end of the dogs 88 are provided with a projection 97. The operation of this portion of the device is as follows. When the clutch is closed, the beveled ends 89 of the dogs 88 are seated in the groove 90 and the projecting end 97 is engaged against the end of the collar 63 and held in this position by coiled springs 98. This position of the dogs 88 locks the clutch closed. To open the clutch the trunnions 95 are rocked in a manner to be explained later, which slides the collar 91 to the right causing the beveled ends 89 of the dogs 88 to ride out of the groove 90, thereby causing the projections 97 to move clear of the collar 63. Thus freed, the collar 84 and its associated members is moved towards the right (Figure 2) by means of a spring 99 which encircles the shaft 33, and which is interposed between the collar 84 and the pinion 70, thereby assuming the position shown in Figure 2. The driven member of this clutch is composed of a ring 100 having its outer surface cone-shaped to correspond to the inner surface of the flange 86 and further provided with an inwardly extending annular flange 101 into which are threaded plungers 102 actuated by springs 103 to normally hold the ring 100 towards the flange 86. The plungers 102 pass through perforations 213 in a flange 104 of the housing 66 thereby causing the ring 100 and the housing 66 to rotate together. As a means of positively preventing the clutch from slipping after the two cone surfaces have come into contact, a locking ring 105 is provided, which has ears 106 formed thereon in which are threaded plungers 107 which have a sliding movement in the hollow shafts 72 and which are normally forced outward by springs 201 which in turn bear against screw plugs 108 threaded into the opposite end of the tubular shafts 72. Teeth 109 are provided on the outer face of the ring 105, which when the clutch has seated, mesh with similar teeth 110 formed on the inner surface of the disk 85, thereby firmly locking these two members together and relieving the cone surfaces of the driving strain.

Figure 1:
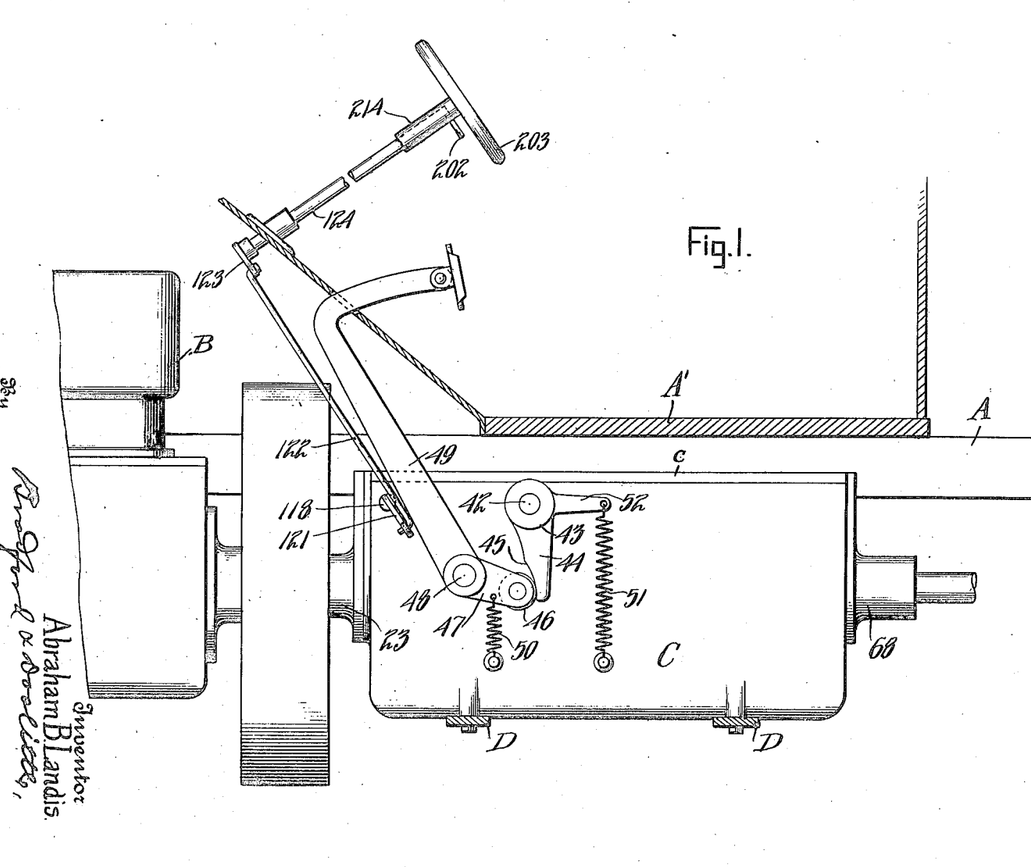
Figure 1 is a view showing my improved transmission in side elevation, as applied to an automobile, showing its connection with the motor and also the relation therewith of the operating levers.
Figures 8, 9, 10:
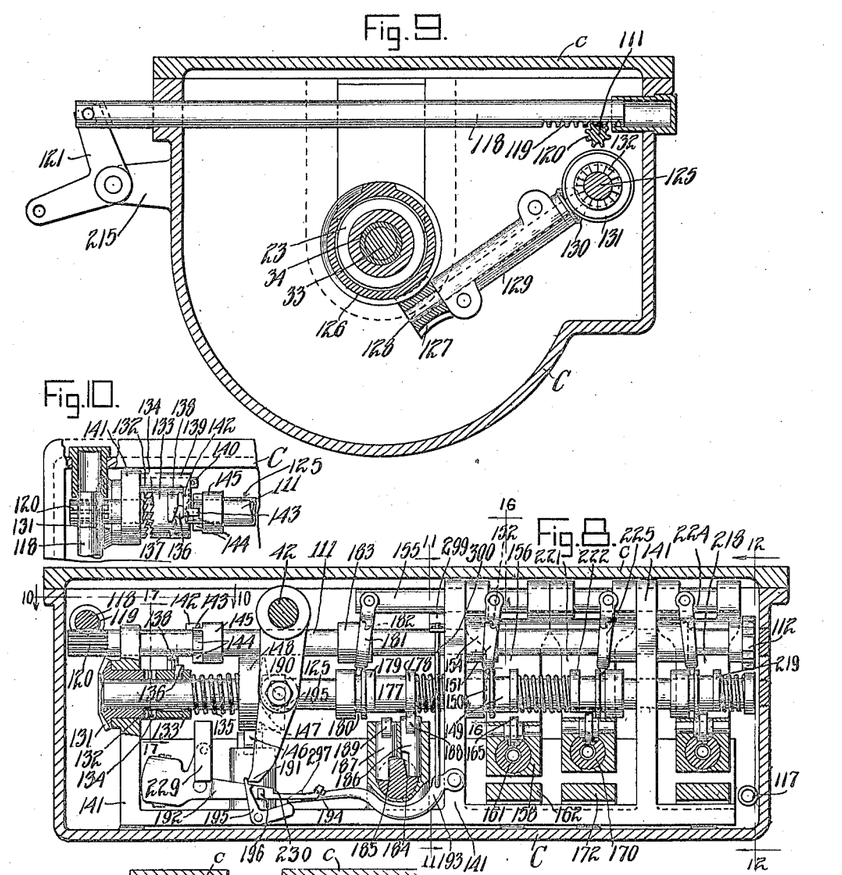
Figure 8, a vertical longitudinal section on the dotted line 8—8 in Figure 2 showing the controlling shaft, cam shaft and the various operating elements adjacent thereto.
Figure 9, a section on the dotted line 9—9 in Figure 2 showing the means for driving the cam shaft.
Figure 10, a detail plan view on the dotted line 10—10 in Figure 8 showing the clutch operating devices of the cam shaft.
Figures 11, 12, 15:
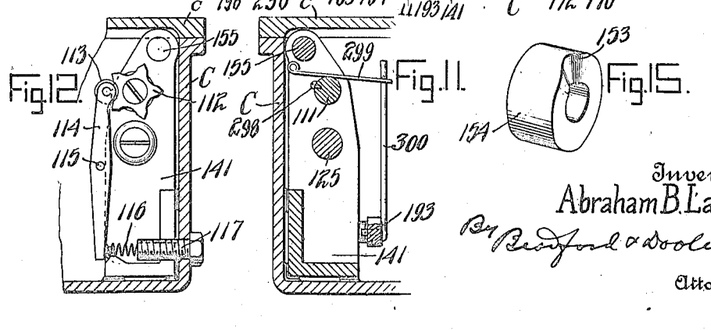
Figure 11, a detail vertical section on the dotted line 11—11 in Figure 8 showing the spring for operating the latch lever.
Figure 12, a detail section on the dotted line 12—12 in Figure 8 showing the pawl for maintaining the position of the controlling shaft.
Figure 15 a detail view of the cam shifting collar.

The various clutches and grip bands previously described are operated by means of the controlling shaft 111 and cam shaft 125 shown in elevation in Figure 8 of the drawings and in several of the sectional views. The controlling shaft 111 is operated by a hand lever 202 or an operating shaft 124 alongside the steering column 214 (Figure 1) to assume selectively either of five positions namely, neutral, first, second and third speed forward and the reverse motion. The controller shaft 111 is retained in these various positions by means of a star wheel 112 (Figure 12) secured on the end of the shaft, and acted upon by a roller 113 carried at the upper end of a lever 114 fulcrumed at 115 on the casing C and actuated by a spring 116 interposed between its lower end and an adjusting screw 117 threaded into the casing C. A rack-bar 118 is employed to rotate the shaft 111 by means of its rack portion 119 meshing with the pinion 120 formed in the end of the shaft 111, as clearly shown in Figures 8 and 9. The rack-bar 118 is reciprocated by means of a bell-crank lever 121, (Figure 1) pivoted to a bracket 215 on the outside of the casing C. A rod 122 connects the lever 121 with the crank arm 123 of a manually operated shaft 124 mounted alongside the steering column 214. Said shaft 124 has a lever 202 on its upper end immediately beneath the steering wheel 203 and in convenient reach of the hand or a finger thereof while on said steering wheel. Whenever the controlling shaft 111 is moved to change the speed of the car, the cam shaft 125 makes one complete revolution. This shaft 125 is driven in the following manner. The sleeve 21 has a worm wheel 126 threaded thereon at a point adjacent to the casing 22 (Figure 9), said wheel 126 meshes with a pinion 127 keyed to the lower end of a shaft 128 mounted in a bearing 129 which is bolted to the casing C. The opposite end of the shaft 128 has a beveled pinion 130 keyed thereto which is in constant mesh with a gear 131 loosely mounted on the end of the cam shaft 125 and provided with clutch teeth 132. A sliding clutch member 133 (Figure 10) having teeth 134 on the end thereof, is keyed to slide upon the shaft 125 and is acted upon by a spring 135 which closes the clutch as soon as the controlling shaft 111 is moved in either direction. The member 133 carries a beveled pin 136 which normally lies in contact with the beveled portion 137 of one arm 138 of a bell-crank lever 139 which is mounted to rock upon a shaft 140 attached to a standard of a supporting frame 141 in which the shafts 111 and 125 are journaled. The other arm 142 of the bell-crank lever 139 is provided with an angular offset 143 which engages depressions 144 formed in a collar 145 which is keyed to the shaft 111. Rotation of the collar 145 by the shaft 111 will lift the arm 142 of the lever 139 thereby causing the arm 138 to lift clear of the pin 136 which permits the spring 135 to force the clutch member 133 into engagement with the teeth 132 on the hub of the gear 131 causing the shaft 125 to rotate. The arm 138 drops immediately into the path of travel of the pin 136 of the clutch member 133 and before said member and shaft 125 has completed its revolution, thereby coming to position to disengage the clutch on completion of one revolution of the shaft 125 and permit the shaft to come to rest. The shaft 125 is at the completion of each revolution and always stopped in the same position, by means of a spring pressed roller 146 which engages with a depression 147 formed in a collar 148 which is keyed to said shaft. Said roller 146 is mounted on the upper end of a plunger 216 in a perforation in frame 141 and under pressure of spring 217 (see Figure 3). A series of four cam sleeves are slidably mounted on the shaft 125 for the purpose of operating the grip bands of the two forward speeds, the reverse and for rocking the yoke 94. These cams are each independently operated from the controlling shaft 111. The first speed cam 149 is provided with an annular groove 150 to receive the lower end of an operating lever 151 which is provided with a projection 152 adapted to coact with a depression 153 formed in a collar 154 which is keyed to the controlling shaft 111 (see Figures 8, 15 and 16). The lever 151 is suspended from a shaft 155 carried by the frame 141 and from this shaft also depends a latch bar 156 (Figure 5) provided with a shoulder 157 which is designed to overlie the depressed end 158 of the grip band 74 which also carries the sliding latch 75. A spring 159 seated in a socket in the casing C normally holds the latch bar 156 in its closed position. A projection 160 depends from the latch bar 156 and enters a bore in the latch 75 in which a spring 161 is located. The purpose of the spring 161 is to force the latch 75 into engagement with the ring 73 after the grip band 74 has brought it to no motion or sufficiently retarded its speed. The end 162 of this band 74 rests on an adjustable wedge 163 operated by means of a screw 164. The end 158 carries a roller 165 adapted to be depressed by the cam 149 until the extreme end 158 is caught beneath the shoulder 157. When the controlling lever is moved to bring the elements into operation to change the speed the same cam 149 serves to unlock this portion of the device by coming in contact with a rib 166 formed just above the shoulder 157 on the latch bar 156.

The operation of the devices for securing the second speed is, in the main, the same as that just described for the first speed. A pivoted latch-bar 218 (Figure 7) corresponds to latch-bar 156 and is operated by cam 219 and spring 220 in the same way and for like purposes. The same mechanical structure and operation is likewise incorporated in the mechanism of the reversing motion, a pivoted latch-bar 221 being mounted on shaft 155 in the same manner as latch-bars 156 and 218 and operated by a cam 222 and a spring 223 in like manner. The construction, arrangement, and operation of the operating lever 224 for the second speed and operating lever 225 for reverse motion are the same in all respects as that described for operating lever 151 for first speed. This mechanism also includes the addition of an adjustable rod 167 which screws into the extension 168 of the grip band 82, passes through a slot 169 in the latch 170, then through a perforation 171 in the lower extension 172 and bears against one end of a curved member 173 which is located beneath the brake band 82 and which has a beveled face at its opposite end as at 174 to act as a wedge beneath a tensioned link 175 upon which rests a lug 176 forming a part of the band 82. The object of this arrangement is to equalize the tension applied to the band 82 and remove the strain from the ends 168 and 172. Gears 78 while shown (Figure 2) as splined to central sleeves or hubs 226 may, as will be readily understood, be made integral therewith. Said sleeves each have a pinion 227 cut on an elongated end thereof, which extends to within an internal gear ring 228, similar to ring 73, so that when grip 82 is brought into operation to hold said ring 228 motion will be transmitted through the connected elements to drive sleeve 67 in reverse direction and thus secure the reverse motion.

The means for accomplishing the direct drive, or high speed, is as follows: a sleeve 177 is splined to the shaft 125 and carries a gradual rising cam 178 and a quick rising cam 179. It is also provided with a groove 180 in which operates the lower end of a shifting lever 181 carried by the shaft 155 and provided with a lug 182 coacting with a depression in a collar 183, similar to that in the collar 154 described. The end of the trunnion 95 which is housed in the bearing 96, before described, is cut away on opposite sides as at 184 and 185 to receive the lower ends of plungers 186 and 187 which carry at their upper ends, rollers 188 and 189. The cam 178 operates against the roller 188 to apply the grip gradually, while the cam 179 operates against the roller 189 to quickly disengage the grip. The gradual application of the grip by the cam 178 entirely eliminates any jolting, or severe strain, to the operating elements of the device.

It will thus be seen that housing 66 is at all speeds an active element in transmitting motion from the driving to the driven part, and when in direct drive the elements for securing the other speeds merely rotate with said housing, being carried thereby. It will also be seen that every time a change is made from one speed to another yoke 41 is first operated to release the main driving clutch and the grip for coupling up the elements to secure the speed desired is set before the clutch is again closed. To insure that the shifting of gear must be made without clash or rasping of parts I provide an automatically operating mechanism as follows: Secured to the shaft 42 is a lever 190 (Fig. 3), the end 191 of which is in a path to be acted upon by a pair of levers 192 and 193 to be described later. A roller 194 is mounted on the lever 190 and is in a position to be acted upon by a cam 195 formed on the end of the collar 148 when the disk clutch is on and the motor is driving the car. It will be seen from the connections already described that at each movement of controlling lever 202 the cam 195 will rock the lever 190 thereby disengaging the main clutch, thus preventing any possible engagement during a shifting of gears while said main clutch is on. A driving ring 196, which is carried by the bell 24 is supported on a series of inwardly extending pins 197 which extend through angle slots 198, (Fig. 13) in the bell 24 and which have blocks 199 (Fig. 3) secured thereto, which are carried without play in grooves 200 in the driving disks 27. The ribs 25 of the bell 24 have a slight play in the grooves 26 which in the event that the car coasts at a speed greater than the motor is driving it, the slight movement of the disks 27 carried by said bell causes a slight advance movement of the blocks 199 which carrying 196 with them and owing to the angular slots 198, imparts a longitudinal movement to said ring and by contact with a block 229 tilts the latch lever 192, (Fig. 8) which is fulcrumed to the frame 141, into operative position. A shoulder 230 formed on the lever 192 then engages point 191 and prevents the lever 190 from advancing far enough to apply the clutch until the speed of the car falls back to the speed of the engine, when ring 196 shifts back and restores the parts to normal position. However, when the car is running faster than the motor speed and it is desired to use the compression of the motor as a brake, the operator can press on the foot pedal 49 thereby causing the end 191 of the lever 190 to press against the beveled end 194 of the lever 192, thereby tilting this lever far enough to engage a pivoted latch 195 with a lug 196 formed on the lever 192, thus permitting the application of the main clutch.

In order to prevent the operator from applying the main clutch before shifting the controlling shaft 111 from the neutral position, the lever 193 is provided which is formed with a hook 297 which engages the end 191 of the lever 190 when the clutch is off, thereby locking the lever from forward movement. The lever 193 is raised into its locked position only when the shaft 111 is in the neutral position, by a projection 298 (Fig. 11) on the shaft 111 which operates to lift a lever 299 pivoted to the frame 141 and carrying a rod 300 which is connected to the lever 193 adjacent its fulcrum.

It will thus be seen that in the operation of this gear the first action occurring after the movement of the controller lever 202 is to open the main driving clutch, thus uncoupling the driving power from the driven parts. The next operation occurring, and practically simultaneous with the uncoupling of the driving clutch, is the release of the grip which sets the mechanism which has been coupled for driving at any particular speed. The next operation is the setting of the grip necessary to secure the operation of the mechanism required to drive at the speed desired, and the final step is to re-set the main driving clutch, which cannot occur at any time while the speed of the car is in advance of the speed of the engine. All of the grips are set first under frictional contact and then through positive engagement of rigid elements so that the advantages of the gradual setting of the driving parts as obtained by frictional contact is secured and yet a positive and unyielding driving connection obtained after said parts have been set. Such a gear enables the driving of the car to be accomplished with very little manual exertion, only such as is required to shift the controlling lever 202 and to operate the foot pedal 49, all of the shifting of gears or mechanical elements required in the driving or the transmission of power being effected automatically by the power of the motor itself.

Having thus fully described my said invention, what I claim as new and desire to secure by Letters Patent is:

1. A change speed transmission comprising a casing, a shaft journaled in said casing, a housing mounted on said shaft, change speed gearing sets mounted in said housing, means by which one element of said change speed gearing sets is checked and stopped by friction, and means by which when stopped it is positively locked in stationary position in relation to said casing.

2. A change speed transmission comprising a casing, a shaft journaled in said casing, a housing mounted on said shaft, change speed gearing sets mounted in said housing, grip bands encircling said housing, grip elements of the gear sets within said bands, means for closing said grip bands upon said elements to check and stop the motion of the same, means by which said grip elements and grip bands are positively locked with each other after same has been stopped, and means for holding said grip bands stationary with relation to said casing.

3. A change speed transmission comprising a casing, a shaft, speed elements mounted upon said shaft journaled in said casing, frictional grip bands surrounding said speed elements, a frictional clutch coupling said shaft to the source of power, a cam shaft located on one side of said shaft, means for driving said cam shaft from the driving element of said frictional clutch, cams on said cam shaft for closing said frictional grip bands, means for locking the grip bands in closed position, means for positively locking said grip bands with a part of the speed element which is held stationary, and means by which said cams unlock said grip bands.

4. A change speed transmission comprising a casing, a shaft journaled in said casing, a frictional clutch coupling said shaft with the source of power, a cam shaft located on one side of said shaft, cams on said cam shaft, a connection with the driving element of said clutch for driving said cam shaft, a cam on said shaft for operating the opening and closing of said frictional clutch, a driven shaft, speed elements mounted on said shaft, means for bringing said speed elements into action and out of action by cams on said cam shaft, said cam shaft being arranged to make one revolution at each change of speed so that in each revolution of said cam shaft in automatic succession it releases said clutch, releases one speed element, brings another speed element into action, and closes said clutch.

5. A change speed transmission comprising a casing, a shaft, different speed gearing sets mounted on said shaft journaled in said casing, means by which one element of each of said sets is stopped by friction and then positively locked, and means for positively and automatically unlocking said element to give freedom of movement when a change is made.

6. A change speed transmission comprising a casing, a shaft journaled in said casing, a housing mounted on said shaft, variable speed gear elements mounted in said housing, a frictional clutch coupling said shaft with the source of power, a cam shaft located to one side of said shaft, a driving connection from the driving element of said clutch with said cam shaft, means to periodically connect said power to transmit motion to said cam shaft, a cam on said cam shaft to open and close said clutch, a cam on said cam shaft for controlling the action or inaction of each of said speed elements, whereby the operation of said change speed is effected by the automatic and successive release of said friction clutch, the release from driving action of one speed element, the bringing into action of another of said speed elements, and the closing of said frictional clutch.

7. A change speed gearing comprising driving and driven elements, a frictional clutch coupling said elements, change speed gears connecting said driving and driven elements, a single element for uncoupling said clutch and changing from one speed gear to another, means for resetting said clutch automatically, and means for preventing said resetting before said change from one speed to another has been effected, substantially as set forth.

8. A change speed gearing comprising a casing, a shaft, a source of power, a frictional clutch coupling said shaft with said source of power, speed elements mounted on said shaft, means by which one of the parts of said elements is held stationary, cams controlling the means for holding said part stationary, means by which said cams are operated by power to alternately hold and release said means for holding stationary said part and means by which said frictional clutch is released and re-set by the power, substantially as set forth.

9. A change speed gearing comprising a casing, a driving element connected with the source of power, a friction clutch, a driven element coupled to said driving element by said friction clutch, a connection from said driven element to the parts to be driven comprising a housing and several sets of variable speed elements mounted in said housing, a grip for setting for action each set of said speed elements, a single element for controlling the action of said several speed elements, and a connection between said single element and a driven part for automatically operating said single element to change the speeds progressively and selectively, substantially as set forth.

10. A change speed gearing comprising a casing, a driving element, a driven element, a main driving clutch interposed between said driving and driven elements, means for varying the speed of the driven element comprising a housing, a plurality of sets of variable speed gears carried by the housing for transmitting motion from the driving to the driven element, a sleeve carried by the driven element said housing being keyed to said sleeve and connected to the driving shaft by the said sets of variable speed gears, means for setting for action either set of said speed gears at will, a connection with the driving power for operating said means, a single controlling element for controlling said operation, said means embodying mechanism for preventing the coupling or uncoupling of the change speed gears while the main driving clutch is coupled, substantially as set forth.

11. A change speed transmission comprising a driving shaft and a driven shaft, a revoluble casing attached to the driven shaft, a friction driving clutch interposed between the driving and driven shafts, a plurality of sets of variable speed gears associated with the housing whereby said housing may be driven at different speeds from said driving shaft, another clutch for connecting said housing direct to said driving shaft for direct drive or high speed, a single controlling element connected to operate said several sets of gears and itself connected to be operated by the power of the engine, controlling mechanism for setting said controlling element to secure the speed desired, said parts being arranged so that the driving clutch is first disengaged, the speed gears last engaged are next disengaged, the speed gears to be next employed are then engaged and finally the main driving clutch is again engaged, substantially as set forth.

12. A change speed gearing comprising a casing, a driving element, a driven element, several sets of variable speed gears for transmitting motion from said driven element to the part to be driven, means for setting either of the said sets of elements for action at will, means for operating said last mentioned means from the driving element, means for releasing the main driving clutch automatically when the speed of the car exceeds the speed of the engine, and means for manually coupling the engine to the driven parts if desired when their speed exceeds the speed of the engine, substantially as set forth.

13. A change speed transmission comprising a driving shaft and a driven shaft, a revolvable casing attached to the driven shaft, change speed gearing sets within the casing, means for driving the change speed gearing sets from the driving shaft, a controlling shaft adapted to be manually operated, a cam shaft, means for automatically giving the cam shaft a single revolution for each adjustment of the controlling shaft, and means operated by the cam shaft for selectively rendering operative any one of the said change speed gearing sets, substantially as set forth.

14. A change speed transmission comprising a driving shaft and a driven shaft, a revolvable casing attached to the driven shaft, change speed gearing sets within the casing, means for driving the change speed gearing sets from the driving shaft, a controlling shaft adapted to be manually operated, a cam shaft, means for automatically giving the cam shaft a single revolution for each adjustment of the controlling shaft, means operated by the cam shaft for selectively rendering operative any one of the said change speed gearing sets, and means for automatically disengaging all of the change speed gearing sets before any one of the sets can be applied, substantially as set forth.

15. A change speed transmission comprising a driving shaft and a driven shaft, a revolvable casing attached to the driven shaft, change speed gearing sets within the casing, means for driving the change speed gearing sets from the driving shaft, a controlling shaft adapted to be manually operated, a cam shaft, means for automatically giving the cam shaft a single revolution for each adjustment of the controlling shaft, means operated by the cam shaft for selectively rendering operative any one of the said change speed gearing sets, means for automatically disengaging all of the change speed gearing sets before any one of the sets can be applied, and means for automatically preventing the application of any change speed gearing set when the speed of the driven shaft exceeds that of the driving shaft, substantially as set forth.

16. A change speed transmission comprising a driving shaft and a driven shaft, a revolvable casing attached to the driven shaft, change speed gearing sets within the casing, means for driving the change speed gearing sets from the driving shaft, a controlling shaft adapted to be manually operated, a cam shaft, means for automatically giving the cam shaft a single revolution for each adjustment of the controlling shaft, means operated by the cam shaft for selectively rendering operative any one of the said change speed gearing sets, means for automatically disengaging all of the change speed gearing sets before any one of the sets can be applied, means for automatically preventing the application of any change speed gearing set when the speed of the driven shaft exceeds that of the driving shaft, and manually applied means for connecting the driving and driven shafts when the driven shaft is rotating at higher speed than the driving shaft, substantially as set forth.

17. A change speed transmission comprising a driving shaft and a driven shaft, a revolvable casing attached to the driven shaft, change speed gearing sets within the casing, means for driving the change speed gearing sets from the driving shaft, a controlling shaft adapted to be manually operated, a cam shaft, means for automatically giving the cam shaft a single revolution for each adjustment of the controlling shaft, means operated by the cam shaft for selectively rendering operative any one of the said change speed gearing sets, means for automatically disengaging all of the change speed gearing sets before any one of the sets can be applied, and means for automatically preventing the driven shaft from engagement with the driving shaft when the speed of the driven shaft is greater than that of the driving shaft, substantially as set forth.

In witness whereof, I have hereunto set my hand and seal at Washington, District of Columbia, this fourth day of December, A. D., nineteen hundred and eighteen.

ABRAHAM B. LANDIS. [L. S.]

Witness:
E. W. BRADFORD.